United States Patent [19]
Morimoto et al.

[11] Patent Number: 5,983,222
[45] Date of Patent: Nov. 9, 1999

[54] METHOD AND APPARATUS FOR COMPUTING ASSOCIATION RULES FOR DATA MINING IN LARGE DATABASE

[75] Inventors: Yasuhiko Morimoto, Yamato; Takeshi Fukuda; Shinichi Morishida, both of Yokohama; Takeshi Tokuyama, Machida, all of Japan

[73] Assignee: International Business Machines Corporation, Armonk, N.Y.

[21] Appl. No.: 08/738,666

[22] Filed: Oct. 25, 1996

[30] Foreign Application Priority Data

Nov. 1, 1995 [JP] Japan .................................... 7-285416

[51] Int. Cl.$^6$ ...................................................... G06F 17/30
[52] U.S. Cl. ......................... 707/6; 707/1; 707/3; 705/10
[58] Field of Search ........................... 707/2–5, 6; 705/10

[56] References Cited

U.S. PATENT DOCUMENTS 5,615,341   3/1997   Agrawal et al. ........................... 705/10

OTHER PUBLICATIONS

R. Agrawal et al., "Mining Association Rules Between Sets of Items in Large Databases", Proc. of the ACM SIGMOD Conference on Management of Data, Washington, DC, May 1993, pp. 207–216.

R. Agrawal et al., "Database Mining: A Performance Perspective", IEEE Transactions on Knowledge and Data Engineering, Special Issue on Learning and Discovery in Knowledge–based Databases, Dec. 1993, pp. 914–925.

R. Agrawal et al., "Fast Algorithms for Mining Association Rules", Proc. of the VLDB Conference, Santiago, Chile, Sep. 1994, pp. 487–499.

R. Agrawal et al., "Mining Sequential Patterns", Proc. of the International Conference on Data Engineering, Mar. 1995, pp. 3–14.

J. Han et al., "Discovery of Multiple–level Association Rules from Large Databases", Proc. of the VLDB Conference, Zurich, Switzerland, Sep. 1995, pp. 420–431.

M. Houtsma et al., "Set–oriented Mining for Association Rules in Relational Databases", Proc. of the 11th Conference on Data Engineering, 1995, pp. 25–33.

H. Mannila et al., "Improved Methods for Finding Association Rules", Pub. No. C–1993–65, University of Helsinki, 1993.

J. S. Park et al., "An Effective Hash–based Algorithm for Mining Association Rules", Proc. of the ACM SIGMOD Conference on Management of Data, San Jose, California, May 1995, pp. 175–186.

A. Savasere et al., "An Efficient Algorithm for Mining Association Rules in Large Databases", Proc. of the 21st VLDB Conference, Zurich, Switzerland, Sep. 1995, pp. 432–444.

G. P. Shapiro, "Discovery, Analysis, and Presentation of Strong Rules", Knowledge Discovery in Databases, AAAI/ MIT Press, Menlo Park, California, 1991, pp. 229–248.

*Primary Examiner*—Thomas G. Black
*Assistant Examiner*—Hosain T. Alam
*Attorney, Agent, or Firm*—Khanh Q. Tran

[57] ABSTRACT

A method is disclosed for computing an association rule in a database having numerical attributes and 0–1 attributes. First, a numerical attribute is divided into a plurality of intervals (or buckets), and each data set is placed into a single bucket according to the value of the numerical attribute. The number of data sets in each bucket and the number of data sets with a 0–1 attribute being 1 are counted. Second, the starting bucket of an interval to be detected is to be detected. Third, the terminating bucket corresponding to the starting bucket is detected. That is, the largest interval with a confidence equal to or larger than a predetermined value. Fourth, one of the detected pairs of starting and terminating buckets which includes the largest number of customers is the answer to this question. Finally, the required data attributes of data included in this interval is subsequently retrieved.

18 Claims, 5 Drawing Sheets

METHOD AND APPARATUS FOR COMPUTING ASSOCIATION RULES FOR DATA MINING IN LARGE DATABASE

FIELD OF THE INVENTION

The present invention relates to an analysis of the correlation among data sets in a database, particularly to a means for determining the correlation among data sets having a numerical attribute and a 0–1 attribute.

BACKGROUND OF THE INVENTION

Analyzing the correlation among data sets in a database to discover a significant association rule among attributes is called "data mining".

The fact that a customer has purchased a commodity A or has a credit card can be considered as data with a 0–1 attribute. This attribute can be indicated by 0 or 1 to represent, respectively, whether or not the customer has purchased a commodity A or has a credit card. Attempts have been made to determine a rule from the correlation based on an 0–1 attribute. For example, R. Agrawal, T. Imielinski and A. Swami, "Mining association rules between sets of items in large databases", Proceedings of the ACM SIGMOD Conference on Management of data, May 1993, and R. Agrawal and R. Srikant, "Fast algorithms for mining association rules", Proceedings of the 20th VLDB Conference, 1994 describe methods for determinating an association rule representing that "a ratio r of the customers who have purchased a commodity A have also purchased a commodity B."

In conventional relational databases, their query languages can be used to provide a numerical attribute A and an interval I in order to easily solve the question, for example, that "X % of the data with A the value of which is included in I has a 0–1 attribute B". In this case, however, the interval I must be input. Current databases do not have a function for outputting the interval I. This is because the association rule between the numerical value and a set of intervals based thereon has a very large searching space.

For example, given a database for data on bank customers, it is very useful to be able to determine an interval I that meets an association rule for a combination of a numerical attribute (an increase in the amount of a fixed deposit) and a 0–1 attribute (whether or not a credit card is used). The association rule may then be used for determining the percentage of customers whose increase in the balance of a fixed deposit is included in the interval I also use a credit card. Although there are many intervals I, generally, the interval I with the largest number of customers can be uniquely determined. The determination of the interval I also allows information useful to other operations to be acquired.

Such questions, however, are applied to databases with a large number of data sets, so it is essential to be able to process such a large number of data sets in practical time.

It is thus an objective of this invention to provide a method for determining the correlation among data sets with a numerical attribute and a 0–1 attribute.

It is another objective of this invention to execute the above processing at a high speed.

It is yet another objective of this invention that if the rate of data sets with their numerical attribute z included in the interval I=[r1, r2] is defined as a support for the interval I, and the rate of those data sets with their numerical value included in the interval I whose 0–1 attributes (a) are 1 is defined as a confidence, the interval I with both a confidence of α % or more and the maximum support (which is referred to as a "dual association rule") can be determined.

SUMMARY OF THE INVENTION

This invention can be mainly divided into the following four sections.

(1) A numerical attribute is divided into a plurality of intervals (buckets), and each data set is placed into a single bucket according to the value of the numerical attribute. The number of data sets in each bucket and the number of data sets with a 0–1 attribute being 1 are counted.

(2) The starting bucket of an interval is detected. That is, s that meets the following condition is found.

$$\omega = \max_{j<s} \left( \sum_{i=j}^{s-1} v_i - \alpha \sum_{i=j}^{s-1} u_i \right) < 0 \qquad (1)$$

where $u_i$ is the number of data sets included in a certain bucket, and $v_i$ is the number of those data sets in a certain bucket with the 0–1 attribute being 1.

(3) The terminating bucket corresponding to the starting bucket is detected. That is, the largest interval with a confidence equal to or larger than the predetermined value of α.

(4) One of the detected pairs of starting and terminating buckets which includes the largest number of customers is the answer to this question. The required data attributes of data included in this interval is subsequently retrieved.

In short, in a database having a plurality of data sets, each including a numerical attribute and a 0–1 attribute, a database retrieval method is described for retrieving data by computing an interval of the numerical attribute in which the probability of the 0–1 attribute being 1 is α or higher and a maximum number of data sets exist. This database retrieval method comprises the steps of: (a) counting the number of data sets included in each bucket which is arranged along an axis corresponding to the numerical attribute, and counting the number of data sets in each bucket, whose 0–1 attributes are 1; (b) determining a starting index s so that Equation (2) is satisfied:

$$\omega = \max_{j<s} \left( \sum_{i=j}^{s-1} v_i - \alpha \sum_{i=j}^{s-1} u_i \right) < 0 \qquad (2)$$

where $u_i$ is the number of data sets included in a bucket, and $v_i$ is the number of data sets in a bucket with the 0–1 attribute being 1; (c) determining a maximum terminating index t that is equal to or larger than the determined starting index s, wherein the probability of the 0–1 attribute being 1 is α or higher between s and t; (d) selecting an interval [s, t] with the largest number of data sets; and (e) retrieving data from the database included in the interval [s, t]. This process enables a dual association rule to be computed.

It is conceivable that each bucket is set so as to include a substantially identical number of data sets as in other buckets.

In the case where each bucket has a substantially identical number of data sets, the following additional steps may be performed to speed up the counting process: randomly sampling X of the N data sets; sorting the X data sets according to the value of the numerical attribute; storing the value of the numerical attribute of the i×X/M-th of the sorted data sets, where i=1, 2, . . . , M–1, and M is the number of buckets; and counting the number of data sets included in each bucket, based on the stored value.

It is preferred that the step of determining the starting index includes the steps of judging whether or not w<0 and $v_{s-1}-\alpha u_{s-1} \geq 0$; if the result of the judging step is positive, then setting $w=v_{s-1}-\alpha u_{s-1}$ and determining whether or not w<0. If the result of the judging step is negative, then setting $w=w+v_{s-1}-\alpha u_{s-1}$ and determining whether or not w<0. These steps allow the starting index s to be found efficiently.

It is also preferred that step for determining the terminating index t starts with the determination of a terminating index t corresponding to the largest starting index s. This technique facilitates the finding of the terminating index t.

It is conceivable that a terminating index t, corresponding to one starting index s, is determined by processing a value equal to or less than a terminating index t', The terminating index t' corresponds to a starting index s' processed immediately before the starting index s.

Another form of this invention that is typically conceivable is the implementation of the above method using an apparatus specially constructed, computer programs, or a medium that stores such computer programs.

DESCRIPTION OF THE PREFERRED EMBODIMENT

The method steps are now described in detail.

(1) Bucket processing

A particular range of the value of a numerical attribute of data is partitioned into buckets, and can be expressed as $B_1$, $B_2$, $B_3$, ... $B_M$, where $B_i=[x_i, y_i]$, $x_i \leq y_i < x_i+1$). The value of the numerical attribute of data is included in one of the buckets. $B_i=(x, x)$ may be used if high resolution is required.

It is conceivable that all the data sets are sorted according to their numerical attributes in order to examine which bucket should contain each data set. If, however, such processing is to be executed and the database contains a very large number of data sets, they cannot be processed within a main memory, resulting in a failure to finish the process in practical time. The following process is thus performed.

It is assumed that there are N data sets and that they are to be put into M buckets. It is also assumed that the i-th bucket cannot be put into the (i+1)-th bucket.

Figure 1:
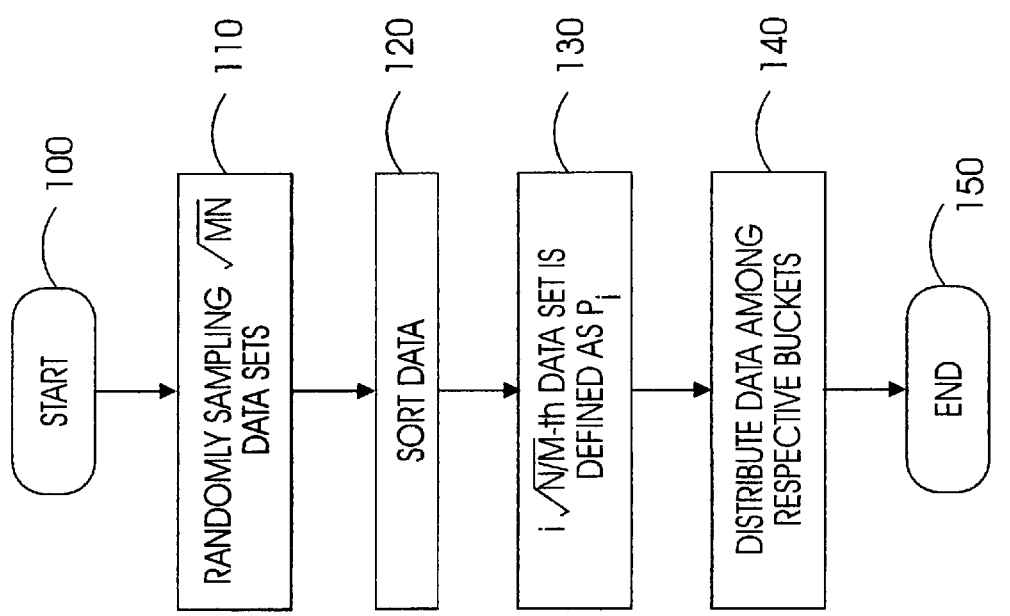
FIG. 1 is a flowchart showing the bucket processing steps.
Figure 3:
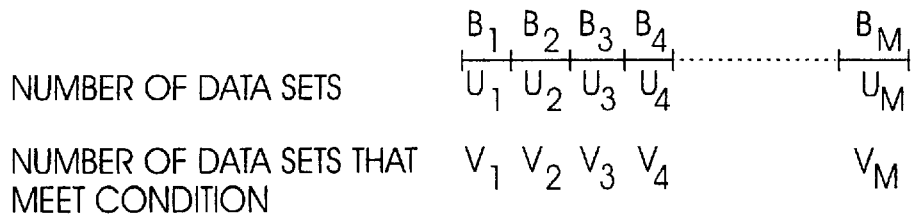
FIG. 3 is a drawing showing the state of the buckets after the bucket processing has ended.

(a) $(M \times N)^{0.5}$ data sets are randomly sampled from the entire data (step 110 in FIG. 1). For example, if M is about 1,000 and N is about one billion, then $(M \times N)^{0.5}$ is about one million. This process can be performed in the main memory of a computer.

(b) The randomly sampled data is sorted (step 120). Calculations can be carried out in the order of $O((M \times N)^{0.5} \times \log(M \times N))$.

(c) The $i(N/M)^{0.5}$-th value is stored as $p_i$ (step 130). In this case, $p_0 = -\infty$ and $P_M = \infty$.

(d) The data sets are put into different buckets (step 140). A bucket $B_i$ contains a data set with (x) corresponding to $p_i < x \leq p_i+1$. This step can be executed in the order of O(NlogM) using binary search. At the same time, the number of data sets in each bucket and the number of data sets with a 0–1 attribute being 1 are counted.

With the above method, the data can be generally processed in the order of O(NlogM). In addition, if the number of data sets to be sampled is $(M \times N)^{0.5}$, it is very likely that the number of errors can be reduced from M/2N to 2M/N.

Figure 2:
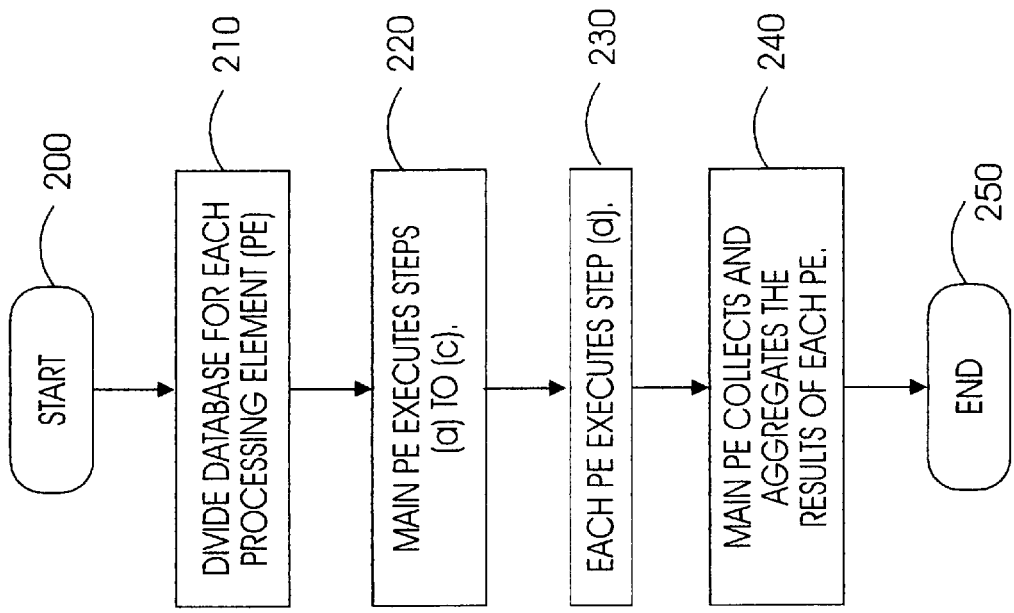
FIG. 2 is a flowchart showing the use of a plurality of processor elements for the bucket processing.

Although step (d) takes the largest amount of time, parallel processing can be used to easily reduce the amount of time. That is, the database is divided into processor elements (step 210 of FIG. 2). A main processor element carries out steps (a) to (c) (step 220). Each of the other processor elements executes step (d) (step 230). The main processor element collects and aggregates the results from each of the other processor elements (step 240). This method reduces the amount of data communication among the processor elements and also reduces the amount of processing time due to the parallel processing of step (d) that is subjected to substantial loads.

In this manner, the first processing of the bucket is completed.

(2) Starting index determination process

Once the buckets have been prepared as described above, a group of the consecutive bucket with a confidence of α or higher and with the maximum support are retrieved. The buckets are referred to as $B_1, B_2, B_3, \ldots, B_M$, the number of data sets in each bucket is $u_i$ (i=1, 2, ..., M), and the number of data sets required to meet a condition is $v_i$ (i=1, 2, ..., M)). The support (s, t) is a support for $xs \leq A \leq yt$ (A represents the attribute of data). It is actually the total number of data sets in a set of the consecutive bucket $B_s$, $B_{s+1}, B_{s+2}, \ldots, B_t$ divided by the total number of data sets N, and can be expressed as follows:

$$\text{Support }(s, t) = \sum_{i=s}^{t} u_i / N \qquad (3)$$

Conf(s, t) is a confidence for $xs \leq A \leq yt$ which meets a condition C. It can be expressed as follows:

$$\text{Conf }(s, t) = \sum_{i=s}^{t} v_i \Big/ \sum_{i=s}^{t} u_i \qquad (4)$$

The objective of this invention is to determine s and t which provide both a conf(s, t) of α or higher and the maximum support (s, t). This pair of s and t is called an "optimal" pair. For any j<s, s that meets conf(j, s−1)<α is "effective".

If a pair s and t that meets $s \leq t$ is optimal, then s is effective. If j that meets conf(j, s−1)≥α exists, then conf(s, t)≥α and conf(j, t)≥α, which is inconsistent with the proposition that the pair of s and t is optimal.

All the values of s that will be effective are found, then the optimal pair is detected. Thus, finding the s that meets:

$$\omega = \max_{j<s}\left(\sum_{i=j}^{s-1} v_i - \alpha \sum_{i=j}^{s-1} u_i\right) < 0 \quad (5)$$

allows an effective s, that is, a starting index to be found.

Figure 4:
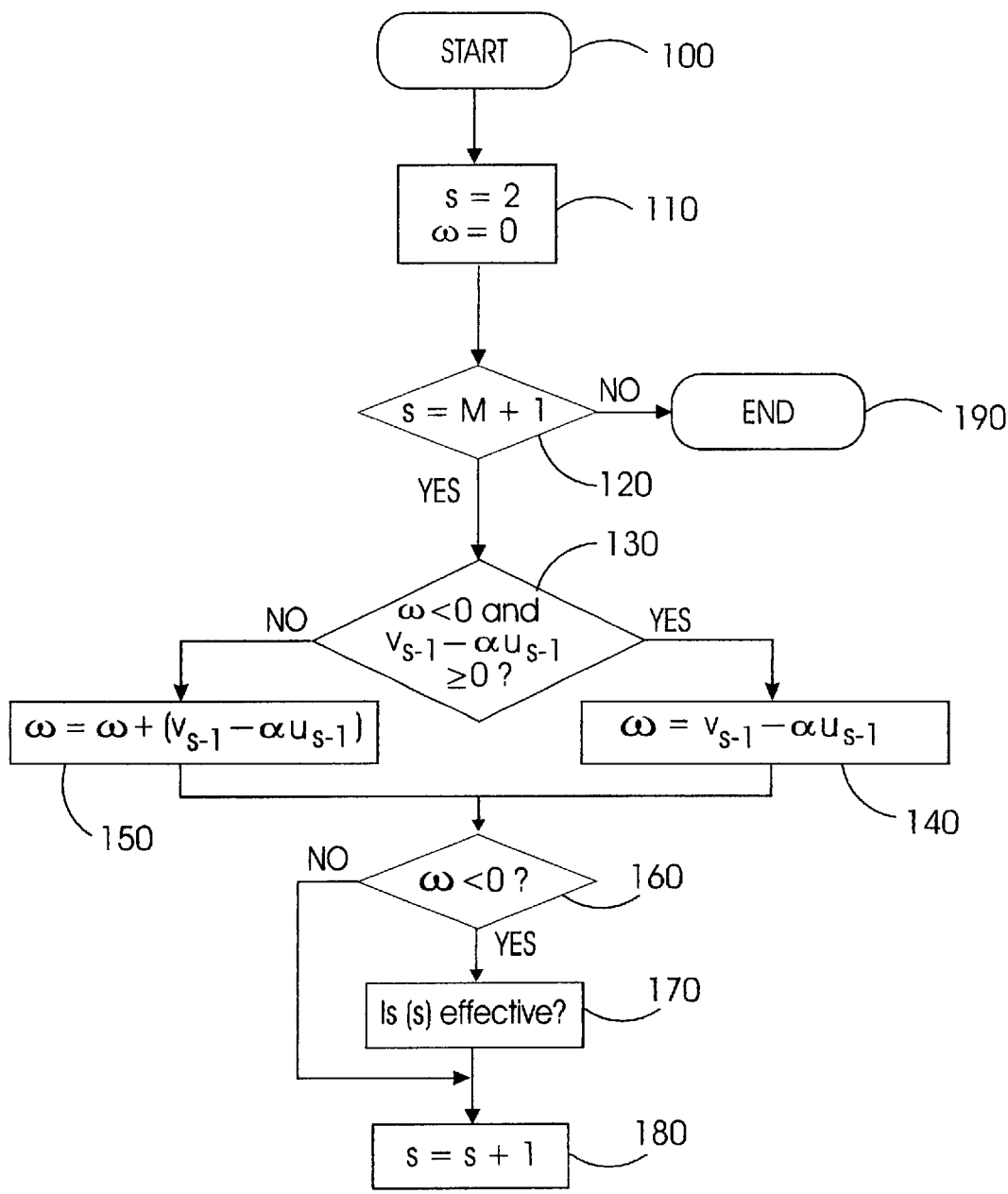
FIG. 4 is a flowchart showing the process for determining an effective value of s.

To find an effective s, the steps shown in FIG. 4, which will be described next, are used. In this case, s=1 is defined as effective. First, to set initial values, s=2 and w=0 are set in step 110. To change s from 2 to M, it is determined in step 120 whether or not s=M+1. If s is equal to or smaller than M, it is determined in step 130 whether or not w<0 and $v_{s-1} - \alpha u_{s-1} \geq 0$.

Since Equation (5) is met for any j<s, Equation (4) is not met if $v_{s-1} - \alpha u_{s-1} \geq 0$. Thus, $v_{s-1} - \alpha u_{s-1}$ that maximizes the value within the parenthesis in Equation (5) is denoted by w in step 140. If the condition in step 130 is not met, $w = w + v_{s-1} - \alpha n_{s-1}$ in step 150. For such w, it is checked in step 160 whether or not w<0.

If w<0, that s is effective in step 170. If it is determined in step 160 that w≧0 or after step 170, s is incremented by one in step 180. The process then returns to step 120.

This process allows effective s to be found. These are starting indices. This process can be carried out in the order of O(M).

A simple specific example is shown below.

TABLE 1

| s | 1 | 2 | 3 | 4 | 5 | 6 | 7 | 8 | 9 | 10 |
|---|---|---|---|---|---|---|---|---|---|----|
| $u_s$ | 10 | 10 | 10 | 10 | 10 | 10 | 10 | 10 | 10 | 10 |
| $v_s$ | 5 | 3 | 2 | 1 | 7 | 2 | 8 | 3 | 4 | 5 |
| w | 0 | 0 | -2 | -5 | -9 | 2 | -1 | 3 | 1 | 0 |
| | ↑ | | ↑ | ↑ | ↑ | | ↑ | | | |

Table 1 shows $u_s$ and $v_s$ with s ranging from 1 to 10, and α used for calculating w is fixed at 0.5. As described above, for s=1, w is zero and effective, so it is marked by an arrow. For s=2, w is zero (w=0+(5−10×0.5)) and is not marked. For s=3, w is −2 (=0+(3−10×0.5)) and is marked. For s=4, since $v_{s-1} - \alpha u_{s-1} = -3$, w is −5 (=−2+(−3)) and is marked. Similarly, for s=5, w is −9 and is marked. For s=6, since $v_{s-1} - \alpha u_{s-1} = 2$, w is 2 and is not marked. For s=7, w is −1 (i.e., w=2+(−3)) and is marked. For s=8, since $v_{s-1} - \alpha u_{s-1} = 3$, w is 3 and is not marked. Likewise, for s=9 or 10, w is not marked. As a result, effective s in this example are 1, 3, 4, 5, and 7.

(3) Terminating index determination process

A notation is first described. The largest t that meets s≦t and conf(s, t)≧α is denoted by top(s). Thus, the objective is to determine top(s) for each s.

Then, for effective s and s', if s≦s', then top(s)≦top(s'). This is because conf(s, s'−1)<α, resulting in conf(s, top(s)) ≧α and conf(s', top(s))≧α.

Figure 5:
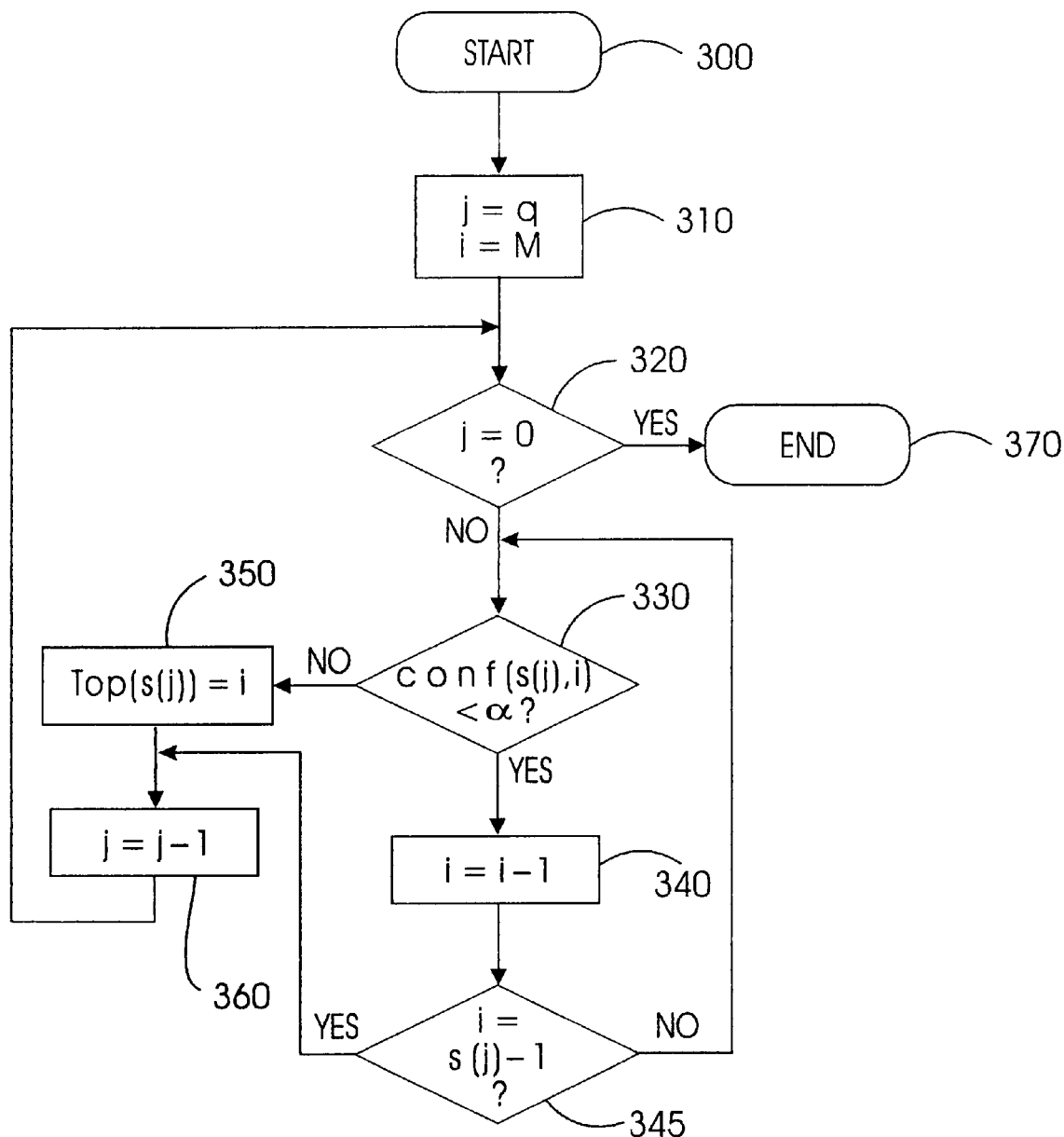
FIG. 5 is a flowchart showing the process for determining top(s)

With this characteristic, the effective values of s are processed in the descending order. The value smaller than top(s) is top(s') for s' that meets s≧s', resulting in a reduced number of steps and an increased calculation speed. Specifically, the process represented by the flow chart of FIG. 5 enables top(s) to be determined. s(j) is in a sequence {s(1), s(2), . . . , s(q)} in which effective s are arranged in the ascending order, and indicates the j-th s. In addition, there are (q) effective s and M buckets, as described above.

The process starts with step 300, and initialization is carried out in step 310 to set j=q and i=M. In order to process all the effective values of s, the method determines in step 320 whether or not j is equal to 0. If all the effective values of s have not been processed, the method determines in step 330 whether or not the condition conf(s(j), i)<α is met. If conf(s(j), i) is less than α, then i is decremented by one in step 340. After several decrementing operations, however, i may become s(j)−1. This condition is inconsistent with the definition of s being effective. Therefore, further calculation is not necessary. The process then proceeds to step 360 to begin processing the next effective s in step 345. If i is not equal to s(j)−1, the process returns to step 330.

If conf(s(j), i)<α is not established in step 330, this means that top(s(j)) has been found, and top(s(j))=i is set in step 350. The value of j is then decremented by one to find top(s) for the next effective s in step 360. Such a process is repeated to find top(s) for the effective s.

The above-described step 330 may be further simplified by calculating Equation (6) and storing the results in the table beforehand.

$$G(j) = \sum_{i=1}^{j} v_i - \alpha \sum_{i=1}^{j} u_i \quad (6)$$

If G(i)−G(s(j)−1)<0, then conf(s(j), i)<α, resulting in fast calculations.

Thus, top(s) (the terminating index t) has been determined. This process can be carried out in the order O(M).

The process for determining the terminating index is now described using the example shown in Table 1.

In this example, the effective values of s are {1, 3, 4, 5, 7}, so the process starts from s=7. First, i=10 is set, and conf(7, 10) is calculated to obtain 0.5. It is then found that i=10 results in top(7). Next, when s=5, conf(5, 10) and conf(5, 9) are smaller than 0.5 if i=10 or 9, whereas conf(5, 8)=0.5 if i=8. Consequently, top(5)=8.

For s=4, the process starts with i=8. When i=4, however, the confidence does not exceed 0.5, so there exists no terminating index corresponding to s=4. The process thus passes to the processing of s=3, but again the confidence does not exceed 0.5 if i=4 or 3. The last i=1 is then processed, but the confidence does not exceed 0.5 unless i=1. As a result, top(1)=1.

Top(7)=10, top(5)=8, and top(1)=1 have thus been obtained.

(4) Determination of the maximum support interval

If any pairs of starting and terminating indices have been determined as described above, one of the intervals I [s, t], which has the highest rate or largest number of customers, is selected. This can be carried out using the following equation.

$$\sum_{i=s}^{t} u_i \quad (7)$$

With this equation, however, a single calculation requires operations in the order of O(M). Thus, the following equation and Sum(t)−Sum(s−1) can be used.

$$\text{Sum}(i) = \sum_{x=1}^{i} u_x \quad (8)$$

In the above example, since [7, 10] and [5, 8] have the same number of data sets, both are output.

Figure 6:
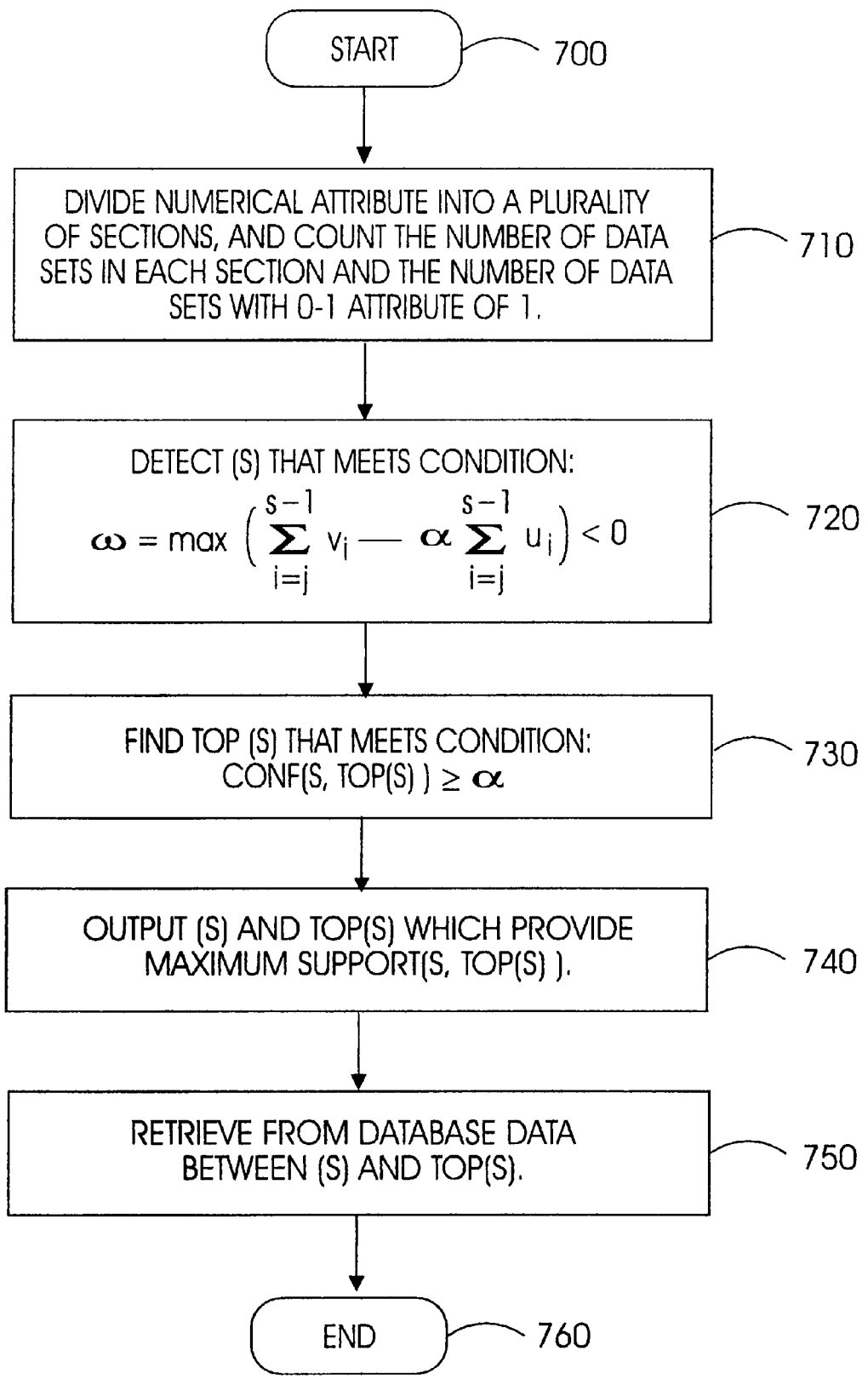
FIG. 6 is a flowchart showing the overall method of the invention.

By obtaining the interval I, the user can easily retrieve the required attributes of data included in the interval I. The attributes required by the user include, for example, customers' names and addresses required for sending direct mails and customer IDs required for extracting customers who are likely to become bankrupt. In the case of relational databases, once the interval I has been determined, subsequent operations as those described in the Background of the Invention section may be easily performed based on the interval. FIG. 6 illustrates the overall process for determining the correlation between datasets, in accordance with the invention.

One embodiment of the invention has been described above. Alternatively, when execution speed is not an important factor, the starting and the terminating indices can be determined by calculating and searching required rows and columns. For example, after the calculations within the parenthesis of Equation (5) have been carried out to prepare a matrix F(j, s) according to the results, one of the rows whose elements for the upper triangle are all negative can be obtained as a starting index. In addition, after the items within the parenthesis of Equation (5) have been modified so as to sequentially add s to t together, the lower triangle of the matrix obtained can be searched for a column corresponding to the starting index s in order to determine the corresponding terminating index.

Figure 7:
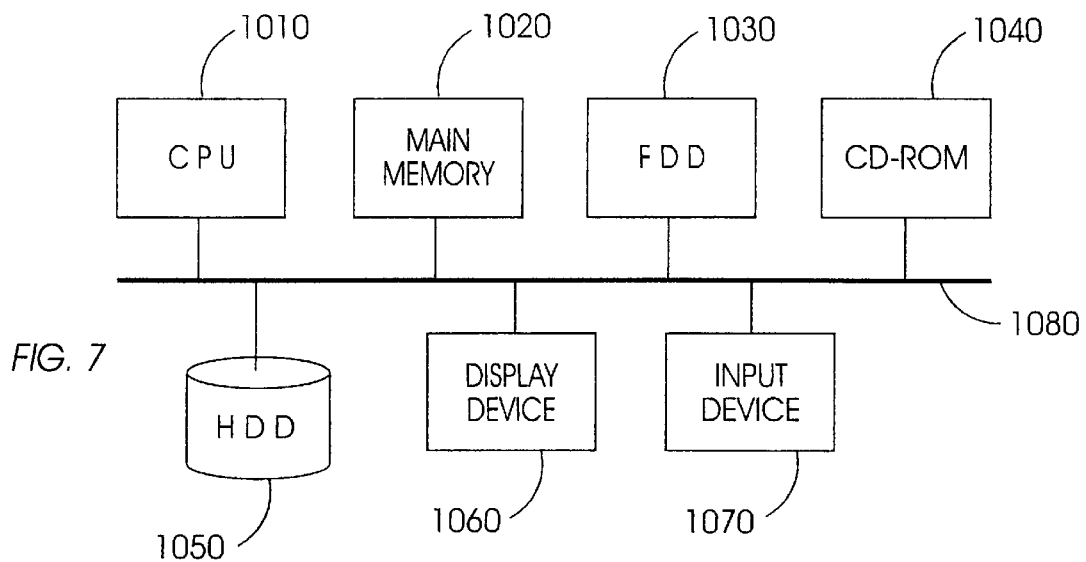
FIG. 7 shows the configuration of a typical general-purpose computer in which the method of the present invention is implemented.

In another aspect of the invention, the method described above may be implemented and executed by computer programs. For example, such programs can be executed by a general purpose computer illustrated by the block diagram of FIG. 7. Processing programs are stored in a hard disk drive (HDD) 1050, and in operation, loaded in a main memory 1020 and processed by a CPU 1010. The HDD 1050 includes a database that is accessed by the processing programs. The user inputs a value of a confidence of T and data output instructions. A display device 1060 displays the determined interval I and the required attributes of data included in the interval I as required. Input devices include a keyboard, a mouse, a pointing device, and a digitizer. The results of output can be stored in a floppy diskette (FDD) 1030 that is a sub-storage device, and new data can be entered therefrom. A CD-ROM drive 1040 can be used to input data.

Computer programs for implementing the process according to this invention can be stored and carried in a storage medium such as a floppy disk or a CD-ROM. In this case, the data retrieval portion of normal database retrieval programs or programs that perform only display operations may be already stored in the HDD 1050. Thus, the other portions or programs are normally carried in such a storage medium.

Figure 8:
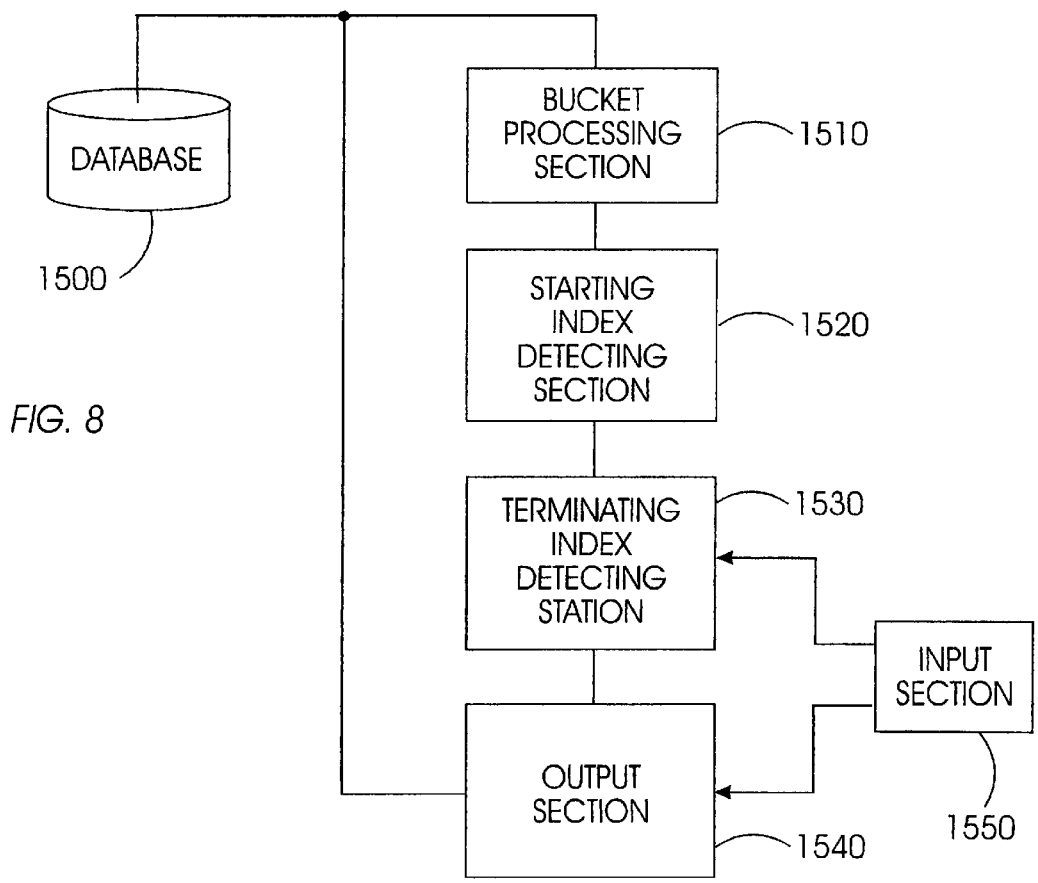
FIG. 8 is a block diagram showing a special apparatus in which the method of the invention is implemented.

A special apparatus for executing the method according to this invention may also be provided. For example, an apparatus such as shown in FIG. 8 is conceivable. A database 1500 is connected to a bucket processing section 1510 and an output section 1540, and the bucket processing section 1510 is connected to a starting index detecting section 1520. The output of the starting index detecting section 1520 is connected to a terminating index detecting section 1530 with its output connected to the output section 1540. An input section 1550 is connected to both the output section 1540 and the starting and the terminating index detecting sections 1520 and 1530.

The bucket processing section 1510 carries out the bucket processing described above, and counts both the number of data sets in each bucket and the number of data sets with a 0–1 attribute being 1. The starting index detecting section 1520 uses the results of the counting and a confidence of α input from the input means to detect effective values of s as described above. The terminating index detecting section 1530 also detects top(s) s according to the confidence of α input from the input section 1530. The output section 1540 selects an interval I from among the values of s and top(s) with the largest support, and extracts the appropriate attributes of data included in the interval I, in response to a signal from the input section 1550 that transmits the user's input. The attributes are displayed on a display device (not shown), printed on a printing device, or stored in a floppy or a hard disk.

The apparatus in FIG. 9 is only an example, and any apparatus that can execute the above processing can be used for this invention. For example, a control section for controlling the overall process is provided to determine both the overall flow of processing and the output form of a signal from the input section 1550.

Based on the foregoing description, a correlation among data sets with a numerical attribute and a 0–1 attribute can been successfully determined. The process for determining this correlation can also be done at a high speed. In addition, the method of the invention allows an interval I with both a confidence of α or higher and the maximum support to be determined.

What is claimed is:

1. A database retrieval method for retrieving data in a database having a plurality of data sets, each said data set including a numerical attribute and a 0–1 attribute, by computing an interval of said numerical attribute in which the probability of said 0–1 attribute being 1 is α or higher and a maximum number of data sets exist, the method comprising the steps of:

counting the number of data sets included in each bucket which is arranged along an axis corresponding to said numerical attribute, and counting the number of those data sets in each bucket, whose 0–1 attributes are 1;

determining a starting index s so that $$\omega = \max_{j<s}\left(\sum_{i=j}^{s-1} v_i - \alpha \sum_{i=j}^{s-1} u_i\right) < 0$$

is satisfied, where $u_i$ is the number of data sets included in a bucket, and $v_i$ is the number of data sets in a bucket whose 0–1 attributes are 1;

determining a maximum terminating index t that is equal to or larger than said determined starting index s, wherein the probability of said 0–1 attribute being 1 is α or higher between s and t;

selecting an interval [s, t] with the largest number of data sets; and retrieving data from the database included in said interval [s, t].

2. The database retrieval method according to claim 1, wherein each said bucket is set so as to include a substantially identical number of data sets.

3. The database retrieval method according to claim 1, wherein said counting step comprises the steps of:

randomly sampling X of said N data sets;

sorting said X data sets according to the value of said numerical attribute;

storing the value of said numerical attribute of the i×X/M-th of the sorted data sets, where i=1, 2, . . . , M−1, and M is the number of buckets; and counting the number of data sets included in each bucket, based on said stored value.

4. The database retrieval method according to claim 1, wherein the step of determining a starting index comprises the steps of:

judging whether or not w<0 and $v_{s-1} - \alpha u_{s-1} \geq 0$;

if the result of said judging step is positive, then setting $w = v_{s-1} - \alpha u_{s-1}$ and determining whether or not w<0; and if the result of said judging step is negative, then setting $w = w + v_{s-1} - \alpha u_{s-1}$ and determining whether or not w<0.

5. The database retrieval method according to claim 1, wherein said terminating index determining step starts with an operation for determining a terminating index t corresponding to the largest starting index s.

6. The database retrieval method according to claim 5, wherein a terminating index t corresponding to one starting index s is determined by processing a value equal to or less than a terminating index t' corresponding to a starting index s' processed immediately before said one starting index s.

7. A database retrieval apparatus for retrieving data in a database having a plurality of data sets, each said data set including a numerical attribute and a 0–1 attribute, by computing an interval of said numerical attribute in which the probability of said 0–1 attribute being 1 is α or higher and a maximum number of data sets exist, the apparatus comprising:

means for counting the number of data sets included in each bucket which is arranged along an axis corresponding to said numerical attribute, and for counting the number of data sets in each bucket whose 0–1 attributes are 1;

means for determining a starting index s so that $$\omega = \max_{j<s}\left(\sum_{i=j}^{s-1} v_i - \alpha \sum_{i=j}^{s-1} u_i\right) < 0$$

is satisfied, where $u_i$ is the number of data sets included in a bucket, and $v_i$ is the number of data sets in a bucket, whose 0–1 attributes are 1;

means for determining a maximum terminating index t that is equal to or larger than s, s being determined by said starting index determining means, wherein the probability of said 0–1 attribute being 1 is α or higher between s and t;

means for selecting an interval [s, t] with the largest number of data sets; and means for retrieving data from the database included in said interval [s, t].

8. The database retrieval apparatus according to claim 7, wherein each said bucket is set so as to include a substantially identical number of data sets.

9. The database retrieval apparatus according to claim 7, wherein said counting means comprises:

means for randomly sampling X of said N data sets;

means for sorting said X data sets according to the value of said numerical attribute;

means for storing the value of said numerical attribute of the i×X/M-th of the sorted data sets, for i=1, 2, . . . , M−1 where M is the number of buckets; and means for counting the number of data sets included in each bucket, based on said stored value.

10. The database retrieval apparatus according to claim 7, wherein said starting index detecting means comprises:

means for judging whether or not w<0 and $v_{s-1} - \alpha u_{s-1} \geq 0$;

means for setting $w = v_{s-1} - \alpha u_{s-1}$ and determining whether or not w<0 if the result of said judging step is positive; and means for setting $w = w + v_{s-1} - \alpha u_{s-1}$ and determining whether or not w<0, if the result of said judging step is negative.

11. The database retrieval apparatus according to claim 7, wherein said terminating index determining means starts with an operation for determining a terminating index t corresponding to the largest starting index s.

12. The database retrieval apparatus according to claim 11, wherein a terminating index t corresponding to one starting index s is determined by processing a value equal to or less than a terminating index t' corresponding to a starting index s' processed immediately before said one starting index s.

13. A computer readable medium comprising program code means for causing a computer connected to a database having a plurality of data sets, each said data set including a numerical attribute and a 0–1 attribute, to compute an interval of said numerical attribute in which the probability of said 0–1 attribute being 1 is equal to or greater than α and the maximum number of data sets exists, said program code means comprising:

program code means for causing said computer to count the number of data sets included in each bucket which is arranged along an axis corresponding to said numerical attribute to count the number of data sets in each bucket, whose 0–1 attributes are 1;

starting index determining program code means for causing said computer to determine a starting index s so that $$\omega = \max_{j<s}\left(\sum_{i=j}^{s-1} v_i - \alpha \sum_{i=j}^{s-1} u_i\right) < 0$$

is satisfied, where $u_i$ is the number of data sets included in a bucket, and $v_i$ is the rate of those data sets in a bucket, whose 0–1 attributes are 1;

terminating index determining program code means for causing said computer to determine a maximum terminating index t that is equal to or larger than s, s being determined by said starting index determining program code means, wherein the probability of said 0–1 attribute being 1 is α or higher between s and t; and program code means for causing said computer to select a interval [s, t] with the largest number of data sets.

14. The computer readable medium according to claim 13, wherein each said bucket is set so as to include a substantially identical number of data sets.

15. The computer readable medium according to claim 13, wherein said counting program code means comprises:

program code means for causing said computer to randomly sample X of said N data sets;

program code means for causing said computer to sort said X data sets according to the value of said numerical attribute;

program code means for causing said computer to store the value of said numerical attribute of the i×X/M-th of the sorted data sets, for i=1, 2, . . . , M−1 where M is the number of buckets; and program code means for causing said computer to count the number of data sets corresponding to each data set, based on said stored value.

16. The computer readable medium according to claim 13, wherein said starting index determining program code means comprises:

judging program code means for causing said computer to judge whether or not w<0 and $v_{s-1} - \alpha u_{s-1} \geq 0$;

program code means for causing the computer to set $w = v_{s-1} - \alpha u_{s-1}$ and determine whether or not w<0 if the result of said judging means is positive; and program code means for causing the computer to set $w=w+v_{s-1}-\alpha u_{s-1}$ and determine whether or not $w<0$ if the result of said judging means is negative.

17. The computer readable medium according to claim 13, wherein said terminating index determining program code means causes the computer to start with an operation for determining a terminating index t corresponding to the largest starting index s.

18. The computer readable medium according to claim 17, wherein a terminating index t corresponding to one starting index s is determined by processing a value equal to or less than a terminating index t' corresponding to a starting index s' processed immediately before said one starting index s.

* * * * *